Jan. 20, 1925.　　　　　　　　　　　　　　　　　　　　1,523,606
R. C. PENFIELD
TRANSFER CAR
Filed July 31, 1923　　　　4 Sheets-Sheet 1

Inventor
Raymond C. Penfield
by James R. Hodder
Attorney

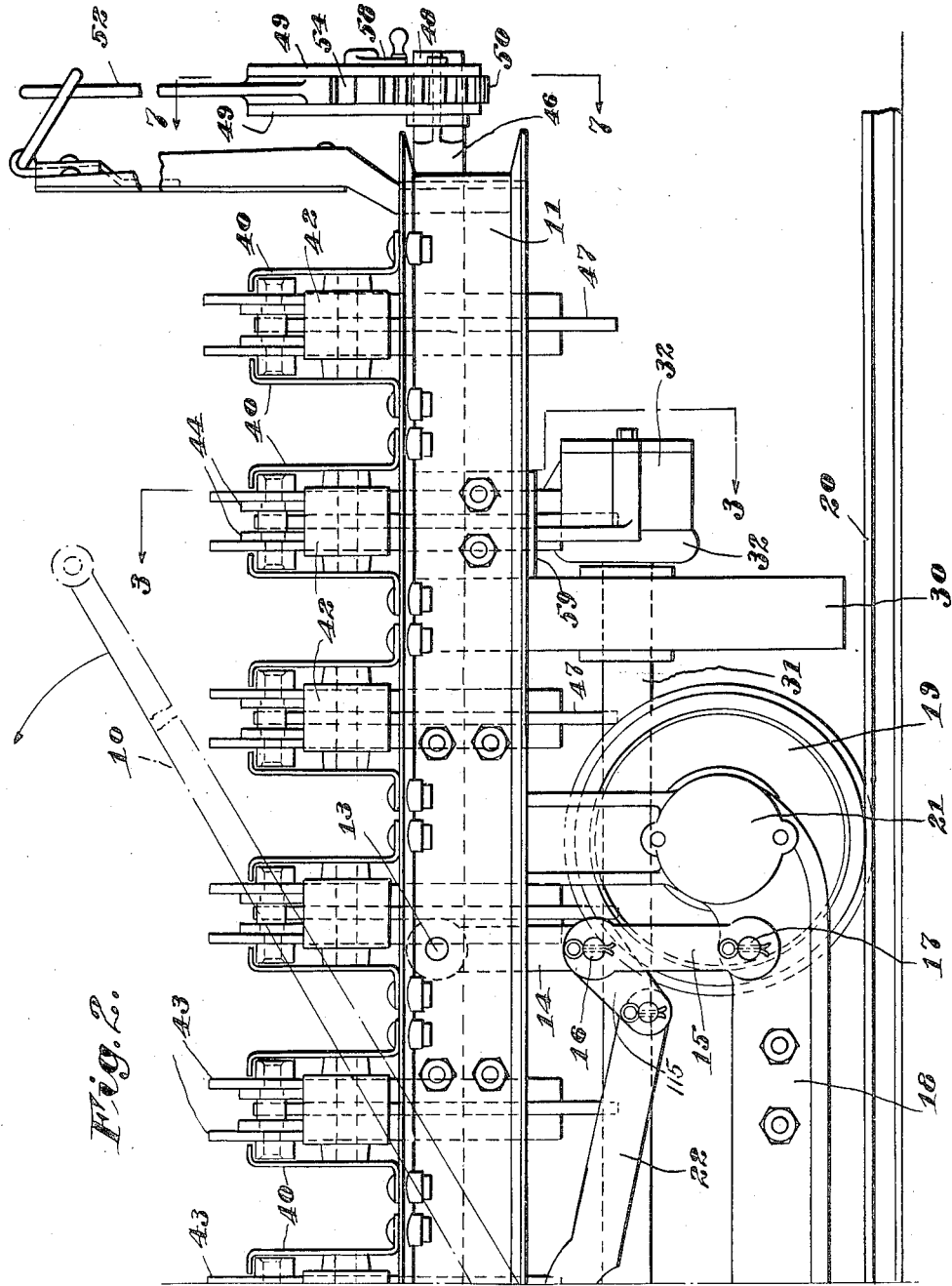

Jan. 20, 1925.
R. C. PENFIELD
TRANSFER CAR
Filed July 31, 1923 4 Sheets-Sheet 3
1,523,606
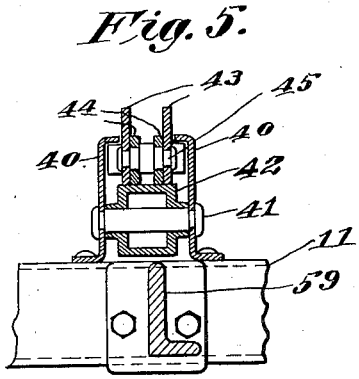
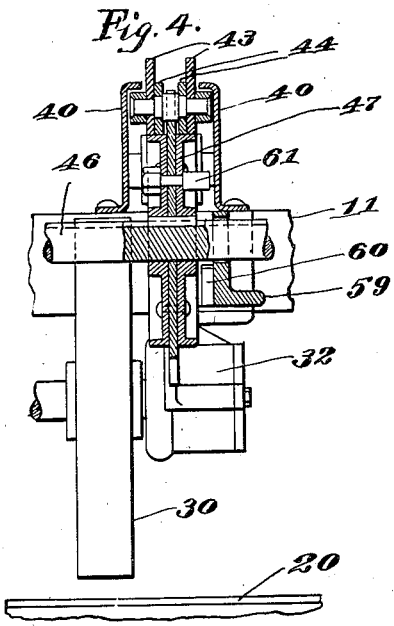
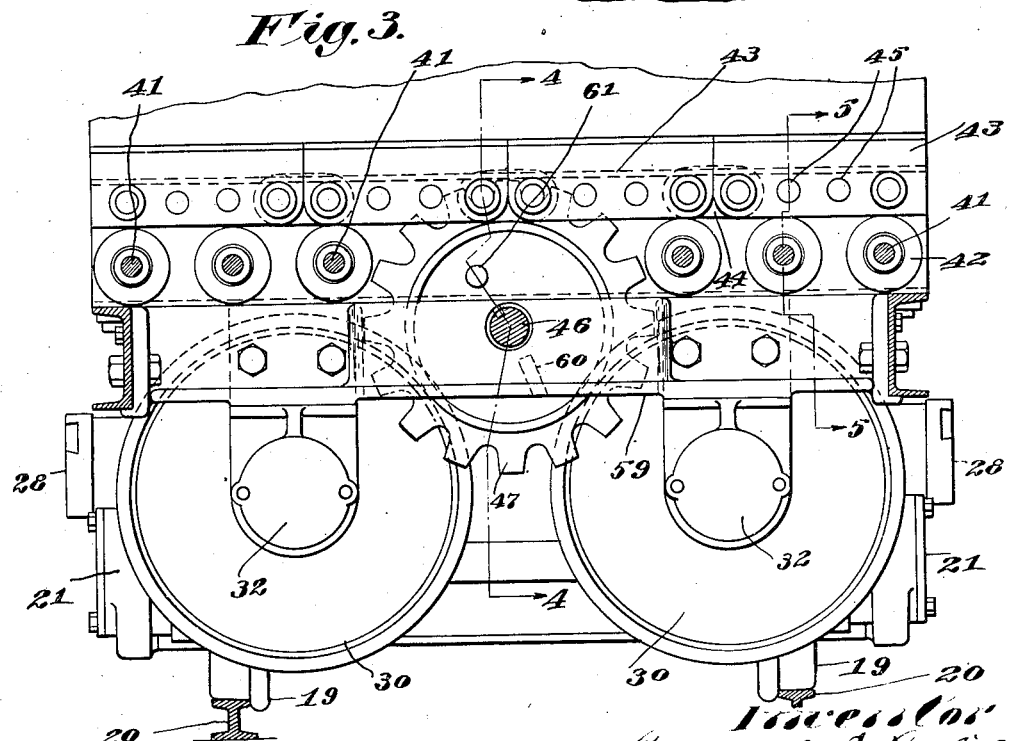
Inventor
Raymond C. Penfield
By James R. Hodder
Attorney

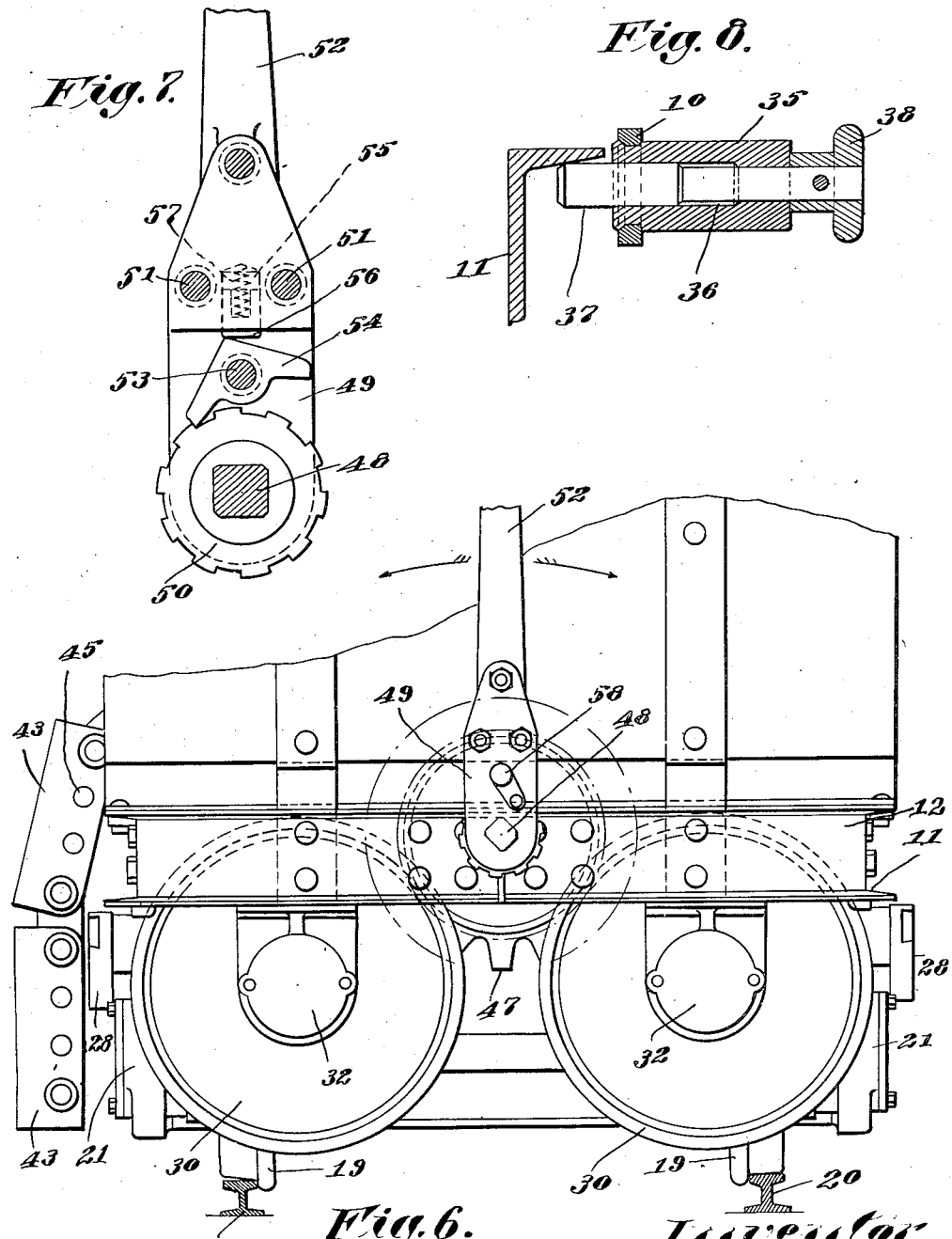

Patented Jan. 20, 1925.

1,523,606

UNITED STATES PATENT OFFICE.

RAYMOND C. PENFIELD, OF NEW YORK, N. Y.

TRANSFER CAR.

Application filed July 31, 1923. Serial No. 654,851.

*To all whom it may concern:*

Be it known that I, RAYMOND C. PENFIELD, a citizen of the United States, and a resident of New York, in the county and State of New York, have invented an Improvement in Transfer Cars, of which the following description, in connection with the accompanying drawings, is a specification, like letters on the drawings representing like parts.

My present invention relates to transfer cars, and more particularly to an improved movable deck for transfer cars.

In the manufacture of brick, the trend of development is in the direction of the substitution of mechanical appliances for the hand operations heretofore employed, and one of such mechanical appliances is a transfer car for use in brick yards where the car will be used, for example, loaded with green brick, run into a drier, pushed through the drier and then transferred in a direction at right angles to a kiln for unloading during kiln building, and for a similar operation in removing the burnt brick from the kiln to a boat, freight car or other transporting conveyance. Such a car has been described and claimed in the patent granted to W. W. Wallace, 1,416,589, dated May 16, 1922. At the loading or unloading point for the transfer car, a difficulty has been experienced in completely loading and unloading the car from one side only as such transfer cars are usually too wide to permit of the operator reaching comfortably entirely across the width of the same, and it has been necessary, therefore, in a number of instances, to employ operatives located on each side of the car. Such a procedure has demanded the use of too many operatives and, in a great many situations, it is impossible to either load or unload the transfer car from but one side.

With a view to obviating the difficulties enumerated above, I have devised the subject matter of the present invention and have associated with a transfer car of the character referred to as being disclosed in the patent to W. W. Wallace, a movable deck, which deck may be moved transversely of the car and by means of which, during the loading process, the side of the deck that is located adjacent the side of the car remote from the operator, will be loaded first and the deck then moved into its normal position, this operation bringing the remainder of the deck of the car into position to be loaded by the operator, and, in the unloading operation, the sequence of operations above referred to, will be reversed.

The principal object of my invention, therefore, is an improved transfer car.

Another object is an improved movable deck for a transfer car.

Other objects and novel features of the construction and arrangement of parts comprising my invention will be apparent as the description of the invention progresses.

In the accompanying drawings illustrating the preferred embodiment of my invention, Figs. 1 and 2, taken together, Fig. 1 to be placed at the left of Fig. 2, is a side elevation;

Fig. 3 is a vertical end section on the line 3—3 of Fig. 2;

Fig. 4 is a vertical section on the line 4—4 of Fig. 3;

Fig. 5 is a vertical section on the line 5—5 of Fig. 3;

Fig. 6 is an end elevation of Fig. 2;

Fig. 7 is a sectional elevation on the line 7—7 of Fig. 2, and,

Fig. 8 is a detail sectional view of the locking means for the controlling mechanism that operates the various sets of wheels of the transfer car.

Figure 1:
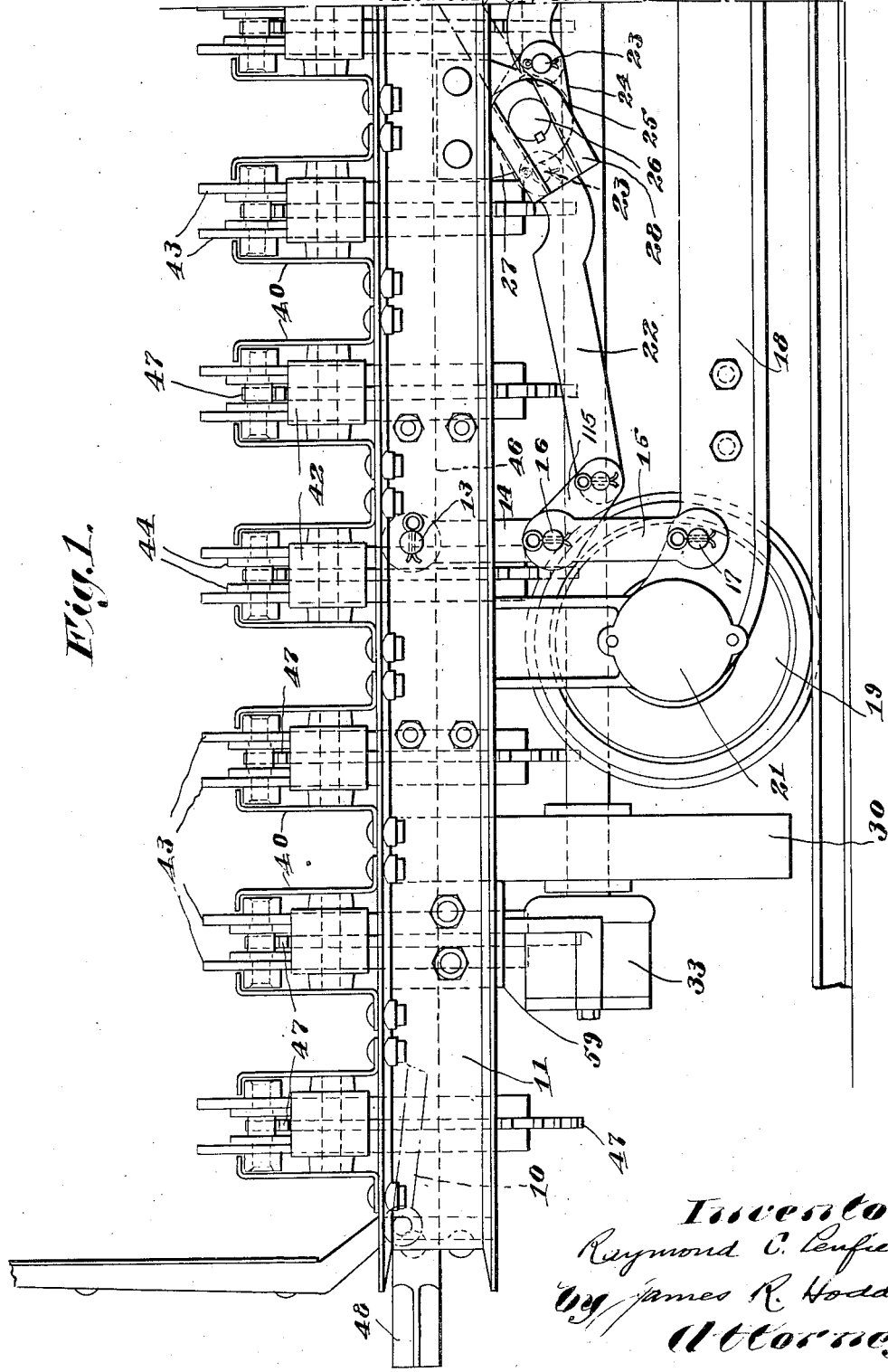

Referring to the drawings, I have shown a car or truck of any suitable design or type, preferably of the type shown in the patent to W. W. Wallace, 1,416,589, above referred to, and that is expressly adapted for handling brick in stacked units by mechanical setters. The truck consists in the usual side frames 11 and end frames 12, preferably of channel bars. To the side frames 11 are pivoted at 13, 13 the arms 14, 14, of a toggle joint, the lower arms 15, 15 being pivoted to the first arms 14, 14 at 16, 16, and being also pivotally joined at 17, 17 with the truck frame 18. The latter carries journal bearings for the flanged wheels 19, 19, said wheels being adapted to run on a track 20. If desired, a ball journal bearing may be utilized, enclosed in the housing 21. Secured to each of the toggle arms 15 is an arm 115, to the free ends of which is pivotally attached one end of bars 22, these bars 22 extending toward each other and being pivotally joined at 23, 23 to a member 24 having its hub 25 journalled on the stud 26 secured to the plate 27 on the frame members 11. To the hub 25 is secured, also, a socketed member 28 adapted to receive a lever 10 to rotate the member 24 on the stud 26 and, by moving the arms 22, 22, to break or strain the sets of toggle arms 14 and 15. By moving the lever 10 from the position shown in Fig. 2 over in the direction of the arrow to the position shown in Fig. 1, the toggle arms are broken, raising the truck frame 18 and carrying the wheels 19 relatively upward with respect to the frame comprised of the side and end members 11 and 12 respectively, and bringing, therefore, the right angle sets of each of the wheels 30, 30 into contact with the ground support or crosswise of the track and the car resting thereon. These wheels are preferably unflanged and adapted to run on bars, each wheel being mounted on an axle 31, journalled in suitable bearings in hangers 32 and 33, four such wheels 30 being shown. The car in this position is adapted to be moved transversely of the former line of movement and the fixed wheels 30 may be positioned sufficiently above the track 20 so that, when desired, a plank may be run under the wheels 30, crosswise of the tracks 20, before the flanged wheels 19 are lifted, thus permitting the transfer car to be run off the tracks at any point desired. Secured to the free end of the lever 10 is a handle member 35 provided with an axial hole 36 in which is slidably mounted a bar 37, to the outer end of which is secured a handle 38, the inner end being adapted to engage with the channel shaped side member 11, this construction being shown in Fig. 8 where the method of operation for locking the lever 10 in either of its extreme positions will be apparent.

The form of car herein illustrated is adapted for use with a mechanical setting device whereby an entire unit or stack of brick, usually from 800 to 1200 in unit stack formation, can be lowered upon the car. In some of these mechanical lifting devices a plurality of lifting bars or fingers are arranged to slide under the brick stack and to be withdrawn from the stack after the latter is set down upon a support. To enable this operation to be carried out, I provide a plurality of spaced supports 40 permitting the lifting bars of a mechanical setter to rest between said supports while depositing a unit stack of brick upon such car for unloading or for permitting a mechanical setter to be applied to a load of brick on such a car to lift the same therefrom.

The spaced supports are each constructed of side plates spaced apart from each other to define an open topped trough extending transversely of the frame of the transfer car, and along the length of such side plates and extending between the same and spaced apart throughout the length thereof are bearing studs or shafts 41 on which are rotatably mounted the rollers 42, and on the rollers 42 rest brick supporting links 43 pivotally joined to each other by links 44 and provided with rods or bars 45 spaced apart from each other a distance equal to the distance between the pivot points of the links 44 for a purpose to be hereinafter described. Extending longitudinally of the frame composed of the side and end members 11 and 12 respectively, and rotatably mounted in suitable bearings in the end members 12, is a shaft 46, which shaft has secured thereon a plurality of gears 47, there being one such gear 47 for each of the sets of links 43, the pitch of the gears 47 being equal to the distance between the rods 45. The shaft 46 extends outward beyond the end of the end plates 11 and its outer end is squared at 48 to receive the squared hole in a ratchet lever mechanism composed essentially of a pair of side plates 49, in the lower end of which is rotatably mounted the toothed member 50 that fits over the squared end 48 of the shaft 46. Secured to the upper ends of the plates 49 by rivets 51 is the lever 52. Rotatably mounted in the side plates 49 is a shaft 53 to which is secured a pawl 54 adapted to engage with, and drive, the member 50 and, therefore, rotate the shaft 46 as the lever 52 is oscillated. The lower end of the lever 52 is drilled at 55 to receive a plunger 56, the inner end of which is recessed to receive a coil spring 57, which coil spring abuts against the inner end of the drilled portion 55, such spring 57 tending to force the plunger 56 upward, or downward, where it engages with the pawl 54 and, as will be understood, keeps one or the other of the teeth of said pawl in engagement with the toothed member 50. Secured to the outer end of the shaft 53 is a handle member, or lever, 58 and by means of which one or the other of the teeth of the pawl 54 may be brought into engagement with the teeth of the member 50 to provide a one way rotation in either direction of the shaft 46.

Secured to the under side of the side members 11 and extending transversely of the frame comprised of the side members 11 and 12 are plates 59, these plates 59 forming a portion of the support for the bearing boxes 32 and 33 of the shafts 31, and, extending upwardly at an angle to the horizontal from the inner side of said plate 59, is a stop pin 60 which lies in the path of movement of a pin 61 secured to the side of the gear 47 at this point. The width of the deck of the car is equal to the length of four of the links 43 and the diameter and pitch of the gears 47 are so proportioned with respect to the distance between the pins 45 that approximately one half revolution of the gears 47 is sufficient to move one half of the number of links 43 of each set of links from the position shown in Fig. 3 to the position shown in Fig. 6 and, when such position is reached, further rotary movement of the gears 47 is prevented by the engagement of the members 60 and 61.

The normal position of the deck of the car is shown in Figs. 1 and 3 and, assuming that there has been deposited on the deck of the transfer car a unit stack of brick and that the operator or operators have unloaded from such transfer car the bricks resting on, for example, the two left hand links 43 of each set of links, it being understood that the width of the car and, therefore, the deck, is too great for one man or set of men to properly unload the material therefrom, means must be provided for bringing the remainder of the bricks either toward the operators or the operators must shift their position to the other side of the car. It is often the case that it is impossible to unload the car from both sides and the present invention is designed to obviate the necessity of so doing. Under the conditions assumed, therefore, the operator, by properly manipulating the lever 52, rotates the shaft 46 and, therefore, the gears 47 to bring the deck comprised of the plurality of sets of links 43, from which the load has been previously removed, into the position shown in Fig. 6, such movement also bringing the bricks resting on the two right hand links of the set of links into position adjacent the left hand side of the car, from which position the bricks may be readily removed without the necessity of the operators shifting their position.

While I have necessarily shown and described the preferred embodiment of my invention somewhat in detail, it is to be understood that I may vary the size, shape, and arrangement of parts comprising my invention within wide limits without departing from the spirit of the invention.

Having thus described my invention, what I claim as new is:

1. An improved transfer car for brick and the like, comprising a frame, a plurality of transversely arranged open troughs mounted thereon, a plurality of rollers mounted in each of said troughs, a platform element comprising a plurality of articulated members arranged in said troughs and movable over said rollers, and means mounted in said frame for moving all of said groups or articulated members simultaneously and transversely of the frame.

2. An improved transfer car for brick and the like, comprising a frame, a plurality of transversely arranged open troughs mounted thereon, a plurality of rollers mounted in each of said troughs, a platform element comprising a plurality of articulated members arranged in said troughs and movable over said rollers, a shaft rotatably mounted in said frame beneath said troughs and extending transversely thereof, means secured to said shaft and engaging said articulated members, and means for rotating said shaft step by step in either direction to cause a transverse movement of the platform elements with respect to said frame.

3. An improved transfer car for brick and the like, comprising a frame, a plurality of transversely arranged open troughs mounted thereon, a plurality of rollers mounted in each of said troughs, a platform element comprising a plurality of articulated members arranged in said troughs and movable over said rollers, a shaft rotatably mounted in said frame beneath said troughs and extending transversely thereof, means secured to said shaft and engaging said articulated members, and means for limiting the rotative movement of the shaft in either direction.

In testimony whereof, I have signed my name to this specification.

RAYMOND C. PENFIELD.